(12) United States Patent
Jeyaraman

(10) Patent No.: US 6,311,187 B1
(45) Date of Patent: Oct. 30, 2001

(54) PROPOGATING UPDATES EFFICIENTLY IN HIERARCHICALLY STRUCTURED DATA UNDER A PUSH MODEL

(75) Inventor: Thulasiraman Jeyaraman, San Jose, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/222,121

(22) Filed: Dec. 29, 1998

(51) Int. Cl.⁷ ............................. G06F 17/30; G06F 12/00
(52) U.S. Cl. ........................ 707/10; 707/2; 707/3; 707/8; 707/103; 707/203; 707/204
(58) Field of Search ................................ 707/3, 2, 8, 10, 707/103, 203, 204

(56) References Cited

U.S. PATENT DOCUMENTS

| | | | |
|---|---|---|---|
| 5,068,804 | * 11/1991 | watanabe et al. | 707/500 |
| 5,430,869 | * 7/1995 | ishak et al. | 707/103 |
| 5,475,837 | * 12/1995 | ishak et al. | 707/103 |
| 5,916,299 | * 6/1999 | poppen | 701/202 |
| 6,192,368 | * 2/2001 | Gerard et al. | 707/103 |

FOREIGN PATENT DOCUMENTS

WO 97/34240  9/1997 (WO).

OTHER PUBLICATIONS

Oh et al., An Increment Update Propagation Scheme for a Cooperative Model, Sep., 1996, IEEE, pp. 353–362.*
Mostardi et al., Achieving Consistency of replicated Copies with the Relay Race Method, Apr. 1993, IEEE, pp. 232–235.*
Alonso et al., Managing Replicated Copies in Very Large Distributed Systems, Nov. 1990, IEEE, pp. 39–42.*
Yamashita et al., View Divergence Control of Replicated Data using Update Delay Estimation, Oct. 1999, pp. 102–111.*
Wiederhold et al., Consistency Control of Replicated Data in Federated Databases, Nov. 1990, IEEE, pp. 130–132.*
Introducing Castanet. Castanet Tuner User's Guide. Available at URL http//www.marimba.com., no date.

(List continued on next page.)

*Primary Examiner*—Thomas Black
*Assistant Examiner*—Frantz Coby
(74) *Attorney, Agent, or Firm*—Park, Vaughan & Fleming LLP

(57) ABSTRACT

One embodiment of the present invention provides a system that efficiently propagates changes in hierarchically organized data to remotely cached copies of the data. The system operates by receiving changes to the data located on the server, and applying the changes to the data on the server. These changes are propagated to remotely cached copies of the data on a client in response to an event on a server, and independently of events on the client, by (1) determining differences between the current version of the data at the server and an older copy of the data at the client, which the server has stored locally; (2) using the differences to construct an update for the copy of the data, which may include node insertion and node deletion operations for hierarchically organized nodes in the data; and (3) sending the update to the client where the update is applied to the copy of the data to produce an updated copy of the data. According to one aspect of the present invention, the act of determining differences, and the act of using the differences to construct the update both take place during a single pass through the data. According to another aspect of the present invention, the update for the copy of the data may include node copy, node move, node collapse, node split, node swap and node update operations.

38 Claims, 7 Drawing Sheets

OTHER PUBLICATIONS

Delivering and Updating Applications with the Castanet198 Infrastructure Suite. Available at URL http://www.marimba.com/three/infrastructure.html., no date.

Publication entitled "Data Caching with Incremental Update Propagation in Mobile Computing Environments", by Hyunsik Chung, et al. Yeungnam University, XP-002157518, Jan. 17, 2001.

Publication entitled "Meaningful Change Detection in Structured Data", by Sudarshan S. Chawathe, et al. ,Stanford University, XP-002157519, May 13, 1997, pp. 26–37.

Publication entitled "A Graphical Environment for Change Detection in Structured Documents", by George S. Chang, et al., New Jersey Institute of Technology, XP-002157517, 1997, pp. 536–540.

Publication entitled "Simple Fast Algorithms for the Editing Distance Between Trees and Related Problems", by Kaizhong Zhang, et al., XP-000978540, Dec., 1989, pp. 1245–1262.

Publication entitled "HTTP: Delta–Encoding Notes", XP-002157520, Jan. 17, 1997, pp. 1–7.

Publication entitled "Web Prefetching Between Low–Bandwidth Clients and Proxies: Potential and Performance", by Li Fan, et al., University of Wisconsin–Madison, XP-00215751?, Jan. 5, 1999, pp. 178–187.

Publication entitled "Web Express: A System for Optimizing Web Browsing in a Wireless Environment", by Barron C. Housel Ph.d, et al. ,IBM Corporation, XP-00215754, 1997, pp. 108–116.

Publication entitled "Optimistic Deltas for WWW Latency Reduction", by Gaurav Banga, et al., Rice University, XP-000874445, 1997, pp. 289–303.

* cited by examiner

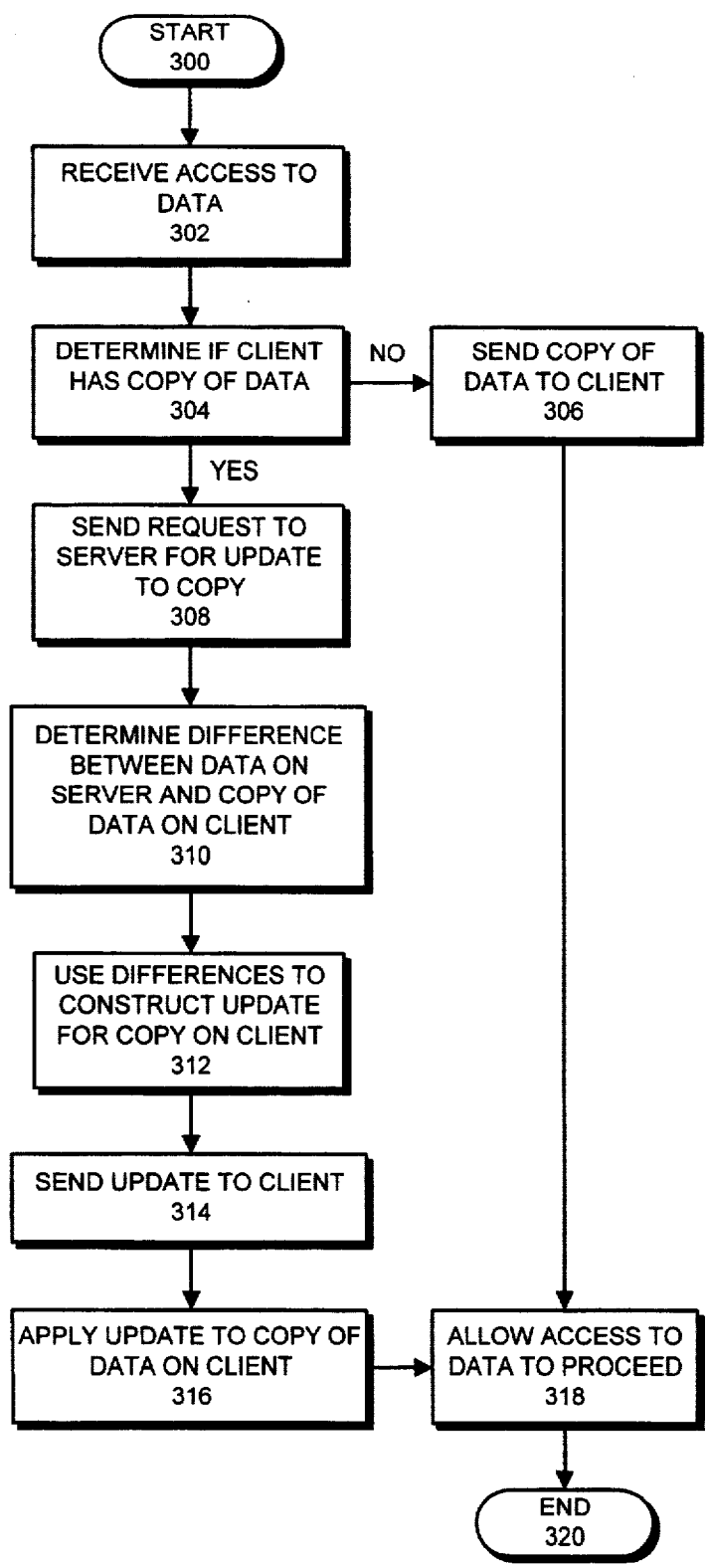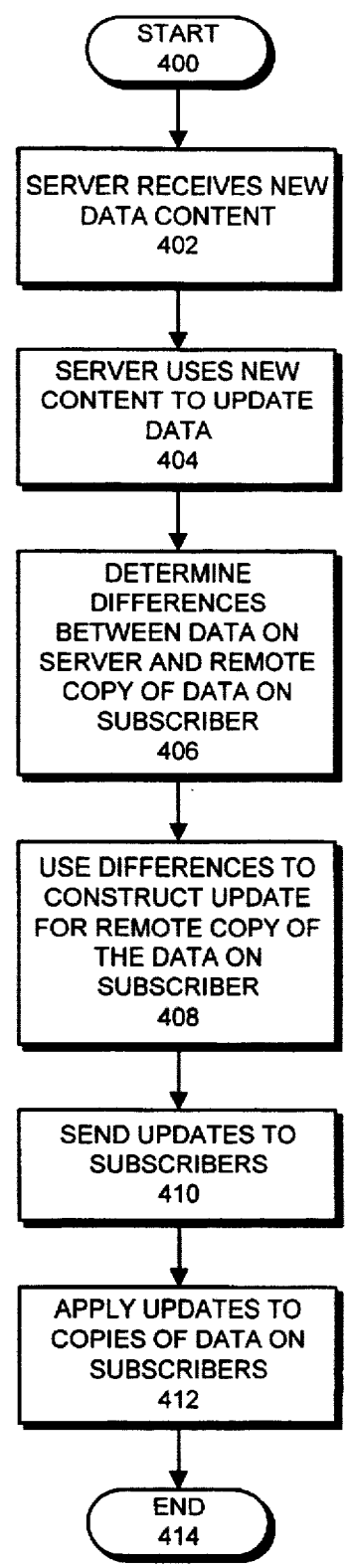
FIG. 3
FIG. 4

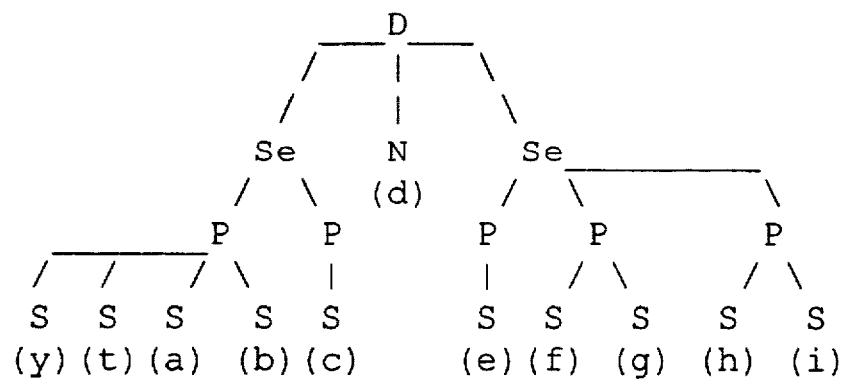
Figure 6A: Sample Document Tree (T1)
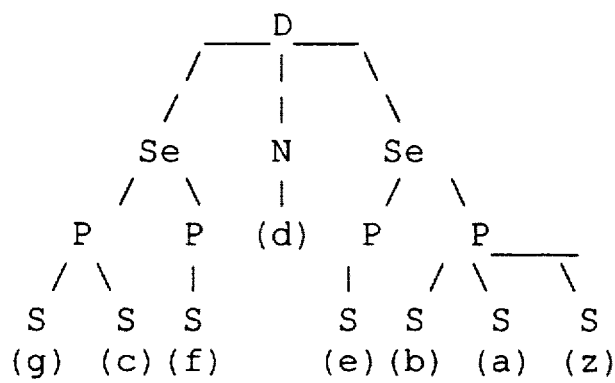
Figure 6B: Modified Document Tree (T2)
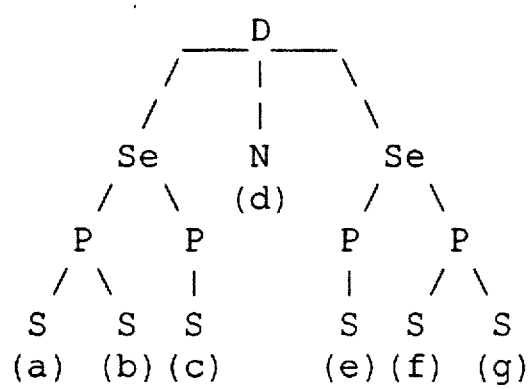
Figure 6C: Document Tree (T1') after deletion phase

PROPOGATING UPDATES EFFICIENTLY IN HIERARCHICALLY STRUCTURED DATA UNDER A PUSH MODEL

RELATED APPLICATIONS

The subject matter of this application is related to the subject matter in two co-pending non-provisional applications by the same inventor as the instant application and filed on the same day as the instant application, entitled: "Propagating Updates Efficiently in Hierarchically Structured Data," having Ser. No. 09/222,088, and filing date Dec. 29, 1998 now pending and "Creating Updates for Copies of Hierarchically Structured Data," having Ser. No. 09/222,115, and filing date Dec. 29, 1998 now pending.

BACKGROUND

The present invention relates to distributed computing systems and databases. More particularly, the present invention relates to a method and an apparatus that facilitates detecting changes in hierarchically structured data and producing corresponding updates for remote copies of the hierarchically structured data.

The advent of the Internet has led to the development of web browsers that allow a user to navigate through inter-linked pages of textual data and graphical images distributed across geographically distributed web servers. Unfortunately, as the Internet becomes increasingly popular, the Internet often experiences so much use that accesses from web browsers to web servers often slow to a crawl.

In order to alleviate this problem, a copy of a portion of a web document from a web server (document server) can be cached on a client computer system, or alternatively, on an intermediate proxy server, so that an access to the portion of the document does not have to travel all the way back to the document server. Instead, the access can be serviced from a cached copy of the portion of the document located on the local computer system or on the proxy server.

However, if the data on the document server is frequently updated, these updates must propagate to the cached copies on proxy servers and client computer systems. Such updates are presently propagated by simply sending a new copy of the data to the proxy servers and client computer systems. However, this technique is often inefficient because most of the data in the new copy is typically the same as the data in the cached copy. In this case, it would be more efficient to simply send changes to the data instead of sending a complete copy of the data.

This is particularly true when the changes to the data involve simple manipulations in hierarchically structured data. Hierarchically structured data typically includes a collection of nodes containing data in a number of forms including textual data, database records, graphical data, and audio data. These nodes are typically inter-linked by pointers (or some other type of linkage) into a hierarchical structure, which has nodes that are subordinate to other nodes, such as a tree—although other types of linkages are possible.

Manipulations of hierarchically structured data may take the form of operations on nodes, such as node insertions, node deletions or node movements. Although such operations can be succinctly stated and easily performed, there presently exists no mechanism to transmit such operations to update copies of the hierarchically structured data. Instead, existing systems first apply the operations to the data, and then transmit the data across the network to update copies of the data on local machines and proxy servers.

SUMMARY

One embodiment of the present invention provides a system that efficiently propagates changes in hierarchically organized data to remotely cached copies of the data. The system operates by receiving changes to the data located on the server, and applying the changes to the data on the server. These changes are propagated to remotely cached copies of the data in response to an event on the server and independently of the client, by (1) determining differences between the current version of the data at the server and an older copy of the data at the client, which the server has stored locally; (2) using the differences to construct an update for the copy of the data, which may include node insertion and node deletion operations for hierarchically organized nodes in the data; and (3) sending the update to the client where the update is applied to the copy of the data to produce an updated copy of the data. According to one aspect of the present invention, the act of determining differences, and the act of using the differences to construct the update both take place during a single pass through the data. According to another aspect of the present invention, the update for the copy of the data may include node copy, node move, node collapse, node split, node swap and node update operations.

BRIEF DESCRIPTION OF THE FIGURES

FIG. 3 is a flow chart illustrating how a client requests an update from a server in accordance with an embodiment of the present invention.

FIG. 4 is a flow chart illustrating how a server automatically updates local copies of documents in accordance with an embodiment of the present invention.

FIGS. 6A–6K illustrate the steps involved in creating updates to transform a document tree T1 into a document tree T2.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
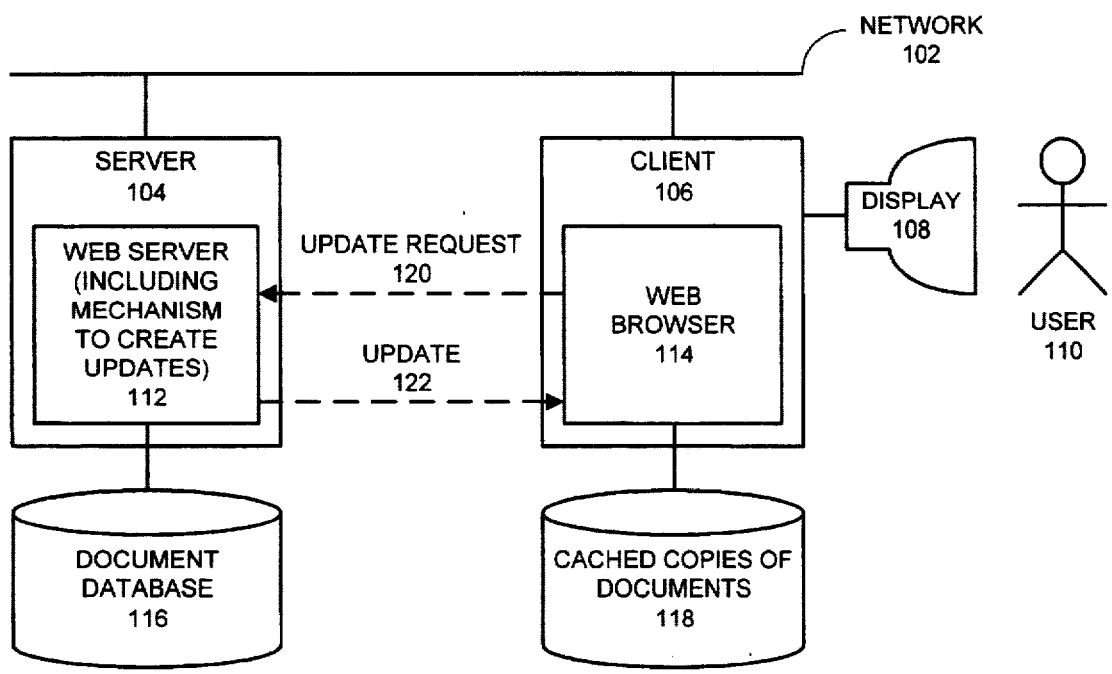
FIG. 1 illustrates a computer system including a web browser and a web server in accordance with an embodiment of the present invention.

FIG. 1 illustrates a computer system including a web browser and a web server in accordance with an embodiment of the present invention. In the illustrated embodiment, network 102 couples together server 104 and client 106. Network 102 generally refers to any type of wire or wireless link between computers, including, but not limited to, a local area network, a wide area network, or a combination of networks. In one embodiment of the present invention, network 102 includes the Internet. Server 104 may be any node coupled to network 102 that includes a mechanism for servicing requests from a client for computational or data storage resources. Client 106 may be any node coupled to network 102 that includes a mechanism for requesting computational or data storage resources from server 104.

Server 104 contains web server 112, which stores data for at least one web site in the form of inter-linked pages of textual and graphical information. Web server 112 additionally includes a mechanism to create updates for remotely cached copies of data from web server 112.

Web server 112 stores textual and graphical information related to various websites in document database 116. Document database 116 may exist in a number of locations and in a number of forms. In one embodiment of the present invention, database 116 resides within the same computer system as server 104. In another embodiment, document database resides at a remote location, and is accessed by server 104 through network 102. Note that portions of document database 116 may reside in volatile or non-volatile semiconductor memory. Alternatively, portions of document database 116 may reside within rotating storage devices containing magnetic, optical or magneto-optical storage media.

Client 106 includes web browser 114, which allows a user 110 viewing display 108 to navigate through various websites coupled to network 102. Web browser 114 stores cached copies 118 of portions of website documents in local storage on client 106.

During operation the system illustrated in FIG. 1 operates generally as follows. In communicating with web browser 114, user 110 generates an access to a document in web server 112. In processing the access, web browser 114 first examines cached copies 118 to determine if the access is directed to a portion of a web document that is already cached within client 106. If so, client 106 makes an update request 120, which is transferred across network 102 to server 104. In response to the request, server 104 generates an update 122, which is transferred to web browser 114. Update 122 is then applied to the cached copies 118 in order to update cached copies 118. Finally, the access is allowed to proceed on the cached copies 18.

Note that although the example illustrated in FIG. 1 deals with web documents for use with web browsers and web servers, in general the present invention can be applied to any type of data. This may include data stored in a hierarchical database. This may also include data related to a directory service that supports a hierarchical name space.

Also, server 104 and web server 112 may actually be a proxy server that stores data in transit between a web server and web browser 114. In this case, the invention operates on communications between the proxy server and web browser 114.

In a variation on the embodiment illustrated in FIG. 1, client 106 is a "thin client" with limited memory space for storing cached copies of documents 118. In this variation, when client 106 requests a document, only a subset of the document that client 106 is actually viewing sent from server 104 to client 106. This subset is adaptively updated as client 106 navigates through the document.

In another variation on the above embodiment, documents from document database 116 are tree-structured. In this variation, documents or portions of documents that are sent from server 104 to client 106 are first validated to ensure that they specify a proper tree structure before they are sent to client 106. This eliminates the need for client 106 to validate the data. (Validation is typically performed by parsing the data, constructing a tree from the data, and validating that the tree is properly structured.) Reducing this work on the client side can be particularly useful for thin clients, which may lack computing resources for performing such validation operations.

Figure 2:
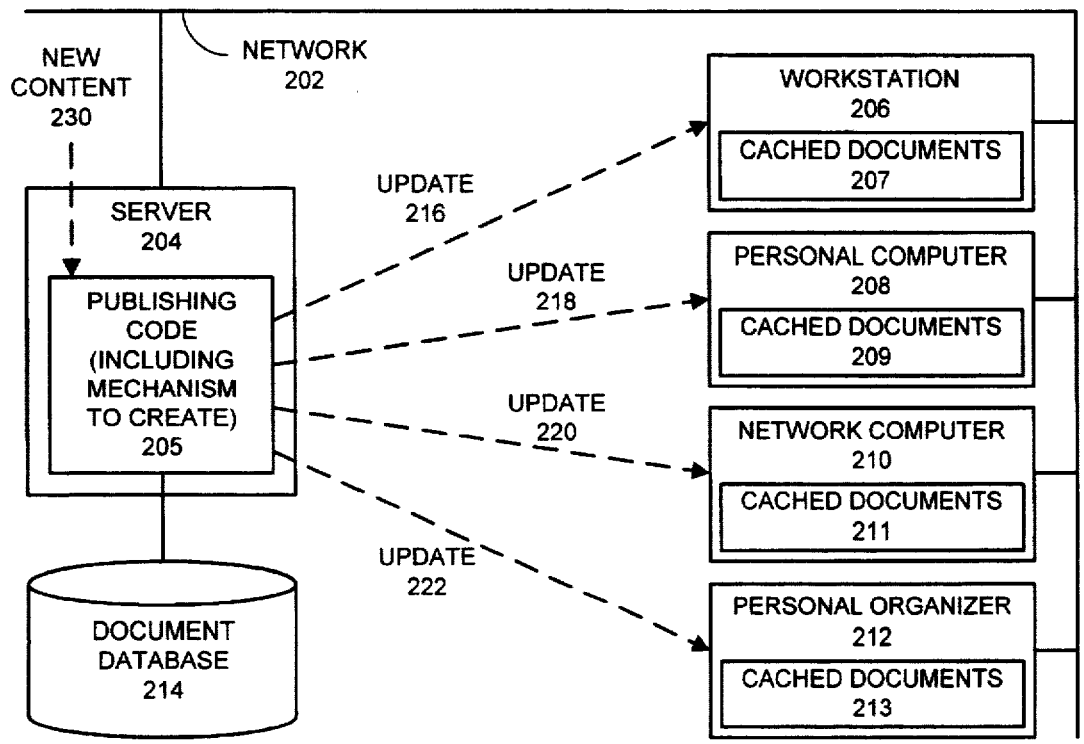
FIG. 2 illustrates a computer system including a server that automatically updates local copies of documents in accordance with another embodiment of the present invention.

FIG. 2 illustrates a computer system including a server that automatically updates local copies of documents in accordance with another embodiment of the present invention. In the embodiment illustrated in FIG. 2, network 202 couples together server 204 with workstation 206, personal computer 208, network computer 210 and personal organizer 212. Network 202 generally refers to any type of wire or wireless link between computers, including, but not limited to, a local area network, a wide area network, or a combination of networks. In one embodiment of the present invention, network 202 includes the Internet. Server 204 may be any node coupled to network 202 that includes a mechanism for servicing requests from a client for computational or data storage resources. Server 204 communicates with a number of clients, including workstation 206, personal computer 208, network computer 210 and personal organizer 212. In general, a client may include any node coupled to network 202 that contains a mechanism for requesting computational or data storage resources from server 204. Note that network computer 210 and personal organizer 212 are both "thin clients," because they have rely on servers, such as server 204 for data storage and computational resources. Personal organizer 212 refers to any of a class of portable personal organizers containing computational and memory resources. For example, personal organizer 212 might be a PALMPILOT™ distributed by the 3COM Corporation of Sunnyvale, Calif. (PalmPilot is a trademark of the 3COM Corporation).

In the illustrated embodiment, workstation 206, personal computer 208, network computer 210 and personal organizer 212 contain cached documents 207, 209, 211 and 213, respectively. Cached documents 207, 209, 211 and 213 contain locally cached portions of documents from server 204.

Server 204 is coupled to document database 214, which includes documents to be distributed to clients 206, 208, 210 and 212. Document database 214 may exist in a number of locations and in a number of forms. In one embodiment of the present invention, document database 214 resides within the same computer system as server 204. In another embodiment, document database resides at a remote location that is accessed by server 204 across network 202. Portions of document database 214 may reside in volatile or non-volatile semiconductor memory. Alternatively, portions of document database 214 may reside within rotating storage devices containing magnetic, optical or magneto-optical storage media.

Server 204 includes publishing code 205, which includes computer code that disseminates information across network 202 to workstation 206, personal computer 208, network computer 210 and personal organizer 212. Publishing code 205 includes a mechanism that automatically creates updates for locally cached copies of documents from document database 214 stored in clients 206, 208, 210 and 212.

During operation, the system illustrated in FIG. 2 operates generally as follows. Publishing code 205 periodically receives new content 230, and uses new content 230 to update documents within document database 214. Publishing code also periodically constructs updates for remotely cached copies of documents from document database 214, and sends these updates to clients, such as workstation 206, personal computer 208, network computer 210 and personal organizer 212. Note that these updates do not simply contain new versions of cached documents, but rather specify changes to cached documents.

Updating Process

FIG. 3 is a flow chart illustrating how a client requests an update from a server in accordance with an embodiment of the present invention. This flow chart describes the operation of the invention with reference to the embodiment illustrated in FIG. 1. First, the system receives a request access the data (step 302). In FIG. 1, this corresponds to user 110 requesting access to a web page or a portion of a web page through web browser 114 on client 106. Next, the system determines if client 106 contains a copy of the data (step 304). This corresponds to web browser 114 looking in cached copies 118 for the requested data. If the data is not present on client 106, the system simply sends a copy of the requested data from server 104 to client 106 (step 306), and this copy is stored in cached documents 118.

If a copy of the data is present on client 106, client 106 sends an update request 120 to server 104 requesting an update to the copy (step 308). In one embodiment of the present invention, update request 120 includes a time stamp indicating how long ago the previous update to cached documents 118 was created. In response to update request 120, server 104 determines differences between the copy of the data on client 106, and the data from document database 116 (step 310). These differences are used to construct an update 122, which specifies operations to update the copy of the data on client 106 (step 312). Note that if client 106 sends a timestamp along with the request in step 308, the timestamp can be used to determine the differences between the data on server 104 and the cached copy of the data on client 106. In another embodiment of the present invention, server 104 saves update 122, so that server 104 can send update 122 to other clients. In yet another embodiment, server 104 keeps track of changes to the data from document database 116 as the changes occur; these changes are aggregated into update 122. This eliminates the need to actually find differences between the data from document database 116 and the cached copy of the data on client 106.

Also note that the operations specified by update 122 may include manipulations of nodes with in the data. For example, if the data is hierarchically organized as nodes in a tree structure, the update may specify tree node manipulation operations, such as move, swap, copy, insert and delete operations for leaf nodes. The data may also specify sub-tree move, copy, swap, insert, delete operations, as well as internal node splitting and internal node collapsing operations. Transmitting such node manipulation operations, instead of transmitting the data that results after the node manipulation operations have been applied to the data, can greatly reduce the amount of data that must be transmitted to update a copy of the data on client 106.

The update may additionally include a Multipurpose Internet Mail Extensions (MIME) content type specifying that the update contains updating operations for hierarchically organized data. This informs a client receiving update 122 that update 122 contains update information, and not regular data. The MIME content type may specify that update 122 contains updating information that has been validated by server 104 so that client 106 does not have to validate update 122.

In one embodiment of the present invention, the steps of determining the differences (step 310) and constructing the update 122 (step 312) take place concurrently during a single pass through the data. This technique has performance advantages over performing these steps separately in two passes through the data.

Next, update 122 is sent from server 104 to client 106 (step 314), and client 106 applies update 122 to the copy of the data (step 316). In one embodiment of the present invention, the copy of the data is stored in semiconductor memory within client 106, and hence applying update 122 to the copy of the data involves fast memory operations, instead of slower disk access operations.

Finally, the original access to the data (from step 302) is allowed to proceed, so that user 110 can view the data on display 108. The above process is repeated for successive accesses to the copy of the data on client.

Note that although the illustrated embodiment of the present invention operates in the context of a web browser and a web server, the present invention can be applied in any context where updates to data have to be propagated to copies of the data. For example, the present invention can be applied to distributed database systems.

FIG. 4 is a flow chart illustrating how server 204 (from FIG. 2) automatically updates local copies of documents in accordance with an embodiment of the present invention. This embodiment is an implementation of a "push" model, in which data is pushed from a server 204 to clients 206, 208, 210 and 212 without the clients having to ask for the data. This differs from a "request" model, in which the clients have to explicitly request data before it is sent as is illustrated in FIG. 1.

The flow chart illustrated in FIG. 4 describes the operation of the invention with reference to the embodiment illustrated in FIG. 2. First, server 204 receives new content 230 (step 402). This new content 230 may take the form of live updates to document database 214, for example in the form of stock pricing information. New content 230 is used to update documents or other data objects within document database 214 on server 204 (step 404).

Next, publishing code 205 within server 204 determines differences between the data in document database 214 and copies of the data on clients (subscribers) 206, 208, 210 and 212, (step 406). These differences are used to construct updates 216, 218, 220 and 222, which specify operations to change copies of the data on clients 206, 208, 210 and 212, respectively (step 408).

Updates 216, 218, 220 and 222 may specify operations that manipulate nodes within the data. For example, if the data is hierarchically organized as nodes in a tree structure, updates 216, 218, 220 and 222 may specify tree node manipulation operations, such as move, swap, copy, insert and delete operations for leaf nodes. The data may also specify sub-tree move, copy, swap, insert, delete operations, as well as internal node splitting and internal node collapsing operations. Transmitting such node manipulation operations, instead of transmitting the data after node manipulation operations have been applied to it, can greatly reduce the amount of data that must be transmitted to update copies of the data on clients 206, 208, 210 and 212.

In one embodiment of the present invention, the steps of determining the differences (step 406) and of constructing updates 216, 218, 220 and 222 (step 408) takes place concurrently during a single pass through the data. This can have a significant performance advantage over performing these steps in two separate passes through the data.

Next, updates 216, 218, 220 and 222 are sent from server 204 to clients 206, 208, 210 and 212 (step 410), respectively. Clients 206, 208, 210 and 212 apply updates 216, 218, 220 and 222 to their local copies of the data 207, 209, 211 and 213, respectively (step 412). In one embodiment of the present invention, these updates are applied to are applied the local copies 207, 209, 211 and 213 "in memory," without requiring disk accesses. This allows to updates to be performed very rapidly.

The above process is periodically repeated by the system in order to keep copies of the data on clients 206, 208, 210 and 212 at least partially consistent with the data on server 204. This updating process may repeated at any time interval from, for example, several seconds to many days.

Process of Creating Updates

Figure 5:
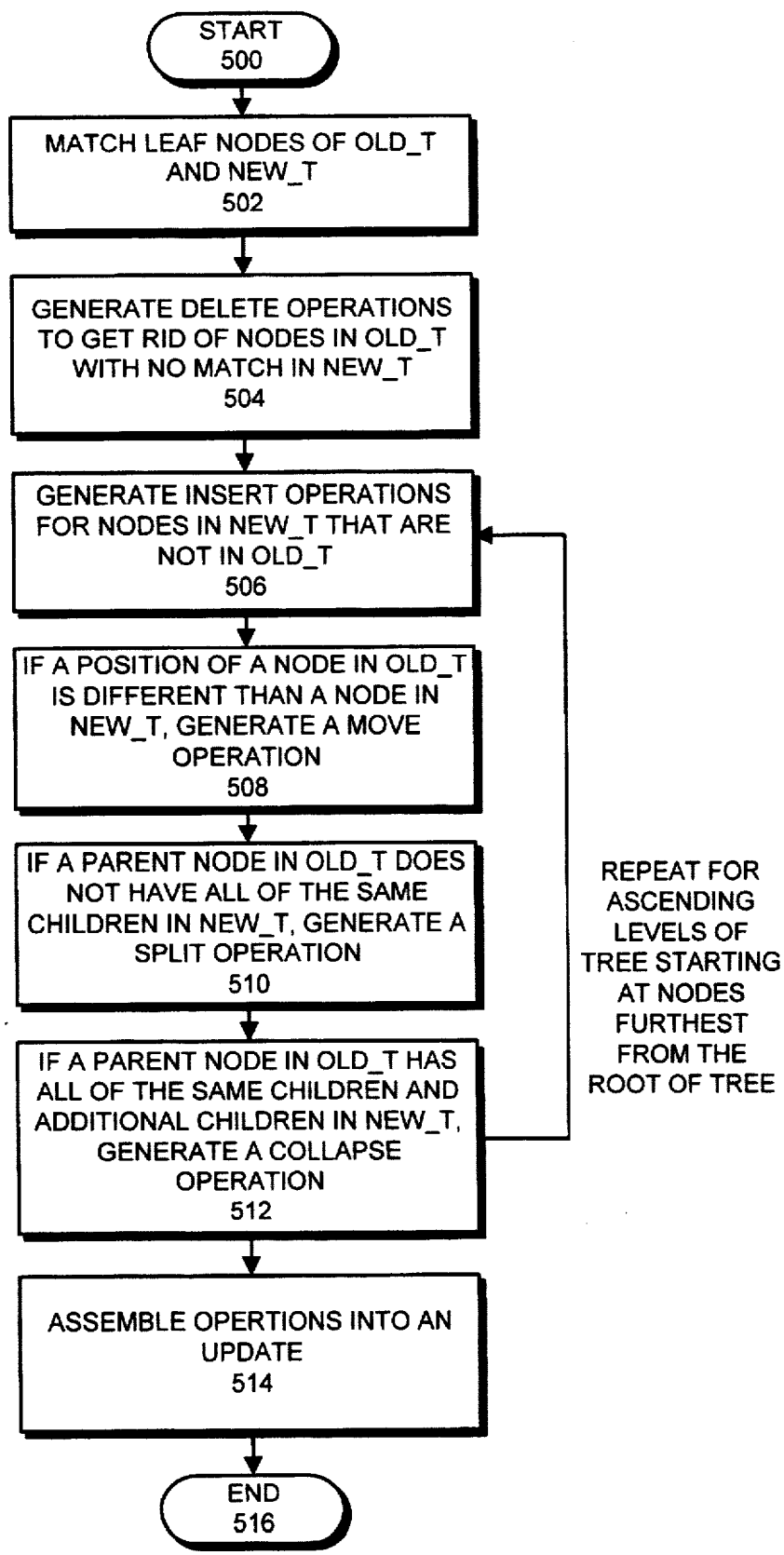
FIG. 5 is a flow chart illustrating how the system creates updates for a new copy of hierarchically structured data in accordance with an embodiment of the present invention.

FIG. 5 is a flow chart illustrating how the system creates updates at the server for a new copy of hierarchically structured data in accordance with an embodiment of the present invention. This embodiment assumes that the data is hierarchically organized as a collection of nodes in a tree structure. This tree structure includes a root node that can have a number of children. These children can also have children, and so on, until leaf nodes, which have no children, are reached. Note that the below-described process for creating updates requires only a single pass through the data. During this single pass the system determines differences between old and new trees and creates corresponding updates to convert the old tree into the new tree. This eliminates the need for a separate time-consuming pass through the data to create updates from differences.

The system starts with an old tree (old_t) and a new tree (new_t). The system first matches leaf nodes of old_t and new_t (step 502). In doing so, the system may look for exact matches or partial matches of the data stored in the leaf nodes. In the case of partial matches, if the quality of a match is determined to be above a preset threshold, the leaf nodes are considered to be "matched." Next, the system generates deletion operations to remove nodes from old_t which are not present in new_t (step 504).

In the next phase, the system repeats a number of steps (506, 508, 510 and 512) for ascending levels of the tree. First, for a given level, the system generates node insertion operations for nodes that are present in new_t but not in old_t (step 506). Also, if the position of a node in old_t is different from the position of the same node in new_t, the system generates a move operation, to move the node from its position in old_t to its new position in new_t (step 508). Additionally, if a parent node in old_t does not have all of the same children in new_t, the system generates a node split operation for the parent, splitting the parent node into a first parent and a second parent (step 510). The first parent inherits all of the children that are present in new_t, and the second parent inherits the remaining children. If a parent node in old_t has all of the same children and additional children in new_t, the system generates a node collapse operation to bring all the children together in new_t (step 512).

Additionally, if all of the children of a first parent in old_t move to a second parent in new_t the system generates a node collapse operation to collapse the first parent into the second parent so that all of the children of the first parent are inherited by the second parent.

The system repeats the above-listed steps 506, 508, 510 and 512 until the root of the tree is reached. At this point all of the operations that have been generated are assembled together to create an update that transforms old_t into new_t (step 514).

EXAMPLE

Figure 6D:
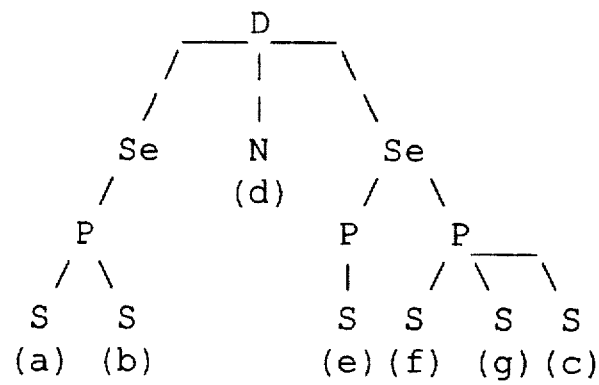

Let us consider the example tree illustrated in FIG. 6A. This tree may represent a document consisting of sections, paragraphs and individual sentences containing parsable character data. Assume that the document grammar also allows documents to contain non-character data, say numeric data, as is represented by the leaf node identifier 'd'. All nodes in FIG. 6A include a name (tag), a value, and an associated value identifier. Since the leaf nodes actually contain data, value identifiers are assigned to them before the process starts; whereas, for an internal node, a value identifier is assigned during the comparison process based upon the value of identifiers of the internal node's children. Note that in some embodiments of the present invention, the tree data structure as represented in memory may conform to the World Wide Web Consortium document object model (W3CDOM).

Additionally, in some embodiments of the present invention, the hierarchically organized data includes data that conforms to the Extensible Markup Language (XML) standard. In other embodiments of the present invention, the hierarchically organized data includes data that conforms HyperText Markup Language (HTML) standard, and other markup language standards.

Notational Semantics

We represent each leaf node by the path from root node to the leaf node containing the position of each node along the path. Hence, the notation for each of the leaf nodes in FIG. 6A is as follows:

D0.Se0.P0.S0 (left-most node)
D0.Se0.P0.S1
D0.Se0.P0.S2
D0.Se0.P0.S3
D0.Se0.P1.S0
D0.Se1.N0
D0.Se2.P0.S0
D0.Se2.P1.S0
D0.Se2.P1.S1
D0.Se2.P2.S0
D0.Se2.P2.S1 (right-most node)

The above notation is used to locate and represent any node in the tree, whether it be a leaf node or internal node.

The notational semantics for each of the tree transformation operations is as follows:

MOV(D0.Se0.P0.S2, D0.Se2.P1.S0). In FIG. 6A, this operation moves the leaf node with value identifier 'a'. Note that a similar operation can be used to represent a movement of an internal node. In the case of an internal node, the entire sub-tree moves. Thus, the movement of an individual node or a sub-tree can be an inter-parent move or an intra-parent move.

SWP(D0.Se0.P0.S2, D0.Se0.P0.S1). This operation is permitted only in the case of nodes that share a common parent (i.e., intra-parent only). The operation swaps the position of the affected nodes, under the common parent. In the case of internal nodes, entire sub-trees are swapped.

CPY(D0.Se0.P0, D0.Se2.P2). This operation replicates a node by making an identical copy on the node. In the case of internal nodes, the entire sub-tree is copied.

INS(D0.Se0.P0.S0, a', {data}). This operation inserts a node in the tree at the given position and assigns to it a value identifier a' along with the {data}. In the case of an internal node, {data}assigned contains a null value.

DEL(D0.Se0.P0) This operation deletes a node and all of its children.

SPT(D0.Se0.P0, I) This operation splits a parent node into a first node and a second node. All of the children of the parent node starting at position I are transferred to the first node. The remaining children are transferred to the second node. The first node gets the same tag type as the original parent node.

CLP(D0.Se0.P0, D0.Se0.P1). This operation collapses the contents of a first node and a second node. The resulting node gets the same tag type as the first node. The children of the second become the right-most children of the resulting node.

UPD(D0.Se0.P0.S2, {delta}). This operation specifies a change{delta}to the contents of a leaf node. The {delta} itself describes how to apply (or merge) the change.

Th example described below generates a set of operations to transform an old tree T1 (FIG. 6A) into a new tree T2 (FIG. 6B). Note that in this example the leaf nodes contain actual data, and the internal nodes simply contain tags which organize and describe the data. There are three phases in the process, including: (1) matching the leaf nodes in T1 and T2; (2) deleting nodes in T1 with no match in T2; and (3) modifying or moving nodes the remaining nodes to create T1.

Phase 1: Matching Leaf Nodes

The first step is to generate a unique identifier for each of the leaf nodes in T2 based on the content of the leaf node. This can be accomplished by using a hash function to generate a unique identifier for each of the leaf nodes. If two leaf nodes have the same content, then the hash function generates the same identifier. If two leaf nodes have the same identifier, it will not cause problems, because the process uses the root node to leaf node path to identify the individual nodes.

Next, the process assigns value identifiers to leaf nodes of T1. For a given leaf node in T1, the process uses a hash function to generate a unique identifier, which matches one of the leaf node identifiers in T2. If the identifier generated does not match any of the identifiers in T2, then process attempts to find a closest matching leaf node in T2, based on some matching criteria. For example, the process may use the Longest Common Sub-sequence (LCS) algorithm ("Data Structures and Algorithms," Aho, Alfred V., Hopcroft, John E. and Ullman, Jeffrey D., Addison-Wesley, 1983, pp. 189–194) to determine a percentage match between the contents of leaf nodes in T1 and T2. The matching criterion can be flexible. For example, the matching criterion may specify a minimum of 30% commonality in order for the leaf nodes to be matched.

Allowing matches to be made on an acceptable matching criteria provides a measure of flexibility. In case a given leaf node's content has been only slightly modified in going from T1 to T2, the system simply matches the node with its modified version in T2. The process subsequently makes the leaf nodes consistent through the UPD(node, delta) operation. However, if the commonality between leaf nodes being matched does not satisfy the matching criterion, the process assigns a unique value identifier to the leaf node in T1, which indicates that the leaf node has been deleted.

In the worst case, the time complexity of finding a match between the leaf nodes will be $O(K^2)$, where K is the number of unique leaf node identifiers in T1 and T2. In the best case, where the leaf nodes in T1 and T2 match in a straightforward manner, the complexity will be 2*K. However, the number of changes in a document from one version to another is typically fairly small, in which case only a few leaf nodes need to be matched based on the weak matching criteria.

Phase 2: Deletion phase

After the matching phase is complete, there may be some leaf nodes in T1, which are not matched to nodes in T2. These unmatched are deleted as follows.

For unmatched leaf nodes in T1 (from left to right), create a delete operation, such as DEL(D0.Se2.P2.S0).

Reduce the number of delete operations, by replacing them with sub-tree delete operations, if possible. If all children belonging to a parent are to be deleted, the delete operation of each of the children can be replaced by a single delete operation of the parent node. This involves scanning the deletion list, looking for common parents. If T1 has K levels, at most K−1 scans are needed to identify a common parent for deletion. Notice that while scanning the ith level, unreduced nodes in the i+1 level can be ignored, since they cannot be further reduced.

After the reductions are performed, the final deletion list is repositioned, because deleting a node at position '0' alters the relative positioning of adjacent nodes. Hence, if two delete operations are to be performed on nodes that have a common parent, then the second delete operation needs to be altered to reflect the change in position of the second node to be deleted.

In the instant example, leaf nodes y, t, h and i in FIG. 6A are unmatched. In accordance with the first step, the system creates following delete operations, DEL(D0.Se0.P0.S0), DEL(D0.Se0.P0.S1), DEL(D0.Se2.P2.S0), DEL(D0.Se2.P2.S1).

In the second step, scanning left to right (scan level 4), the system notices that all of D0.Se2.P2's children are to be deleted. By reducing the individual delete operations "DEL(D0.Se2.P2.S0)" and "DEL(D0.Se2.P2.S1)" into a single delete operation of the parent "DEL(D0.Se2.P2)" we are left the following delete operations.

DEL(D0.Se0.P0.S0),

DEL(D0.Se0.P0.S1),

DEL(D0.Se2.P2).

Continuing with the level 3 scan, the system notices that the only eligible delete operation for reduction is DEL(D0.Se2.P2), since the other delete operations DEL(D0.Se0.P0.S0) and DEL(D0.Se0.P0.S1) are at level 4. Since D0.Se2.P2's parent has other children which do not participate in the delete operation, the reduction ends at scan level 3.

In the third step, the system checks to see if applying the first delete operation will affect the relative node position of any other delete operation. This involves looking for nodes having the same parent as the node being deleted. If such a node exists, the system adjusts its node position accordingly. Note that the entire deletion list need not be scanned to identify sibling nodes, because the inherent ordering in the deletion list ensures that deletion operations for sibling nodes will be close together in the deletion list.

Continuing with the example, the system notices that applying the delete operation DEL(D0.Se0.P0.y0) will affect the relative positioning of sibling node D0.Se0.P0.t1. So, the system adjusts the position of its sibling (See FIG. 6C). Hence, the final deletion list becomes, DEL(D0.Se0.P0.S0), DEL(D0.Se0.P0.S0), DEL(D0.Se2.P2).

Phase 3: Modification Phase

The modification phase brings together the children of internal nodes, in a bottom-up fashion. This involves scanning all the nodes from the bottom-most level (furthest from the root), and scanning each level until level zero is reached. Note that the identity of each internal node is established by the collective identity of its children. For example, if a parent node's children are identified as 'a' and 'b' respectively, then the identity of the parent is 'ab.'

Also, if a parent node is left with no children as a result of a move operation, the parent node is deleted. Furthermore, in the special case where there is a skewed tree or sub-tree of nodes having just one child, i.e., a→b→c→d, when node 'd' is deleted, node 'c' is also be deleted. This action is repeated until node 'a' is deleted as well. Instead of generating an individual delete operation for each one of the nodes, the chain of delete operations is reduced to a single delete operation of the grandest common parent of all nodes being deleted.

Pseudo-code for one embodiment of the modification phase appears below.

For each level_i in T2 (leaf to the root) {

1. TO_BE_COMPLETED_LIST=list of all the node value identifiers at level_i in T2.

2. If the node in the TO_BE_COMPLETED_LIST is the root node, find the matching node 't' in T1'. If 't' happens is a root node, break from the loop.

Else, partition T1' into two nodes, such that the sub-tree rooted at 't' is moved away from T1', and becomes another tree (T1"). Next, delete the source partition (T1') by deleting its grandest common parent (the root). T1" and T2 are now identical.

} (end of for loop)

3. Pick one of the nodes 'k' from TO_BE_COMPLETED_LIST, typically the left-most node. SIBLING_LIST=siblings of 'k', including 'k'. Note that we use the term 'node' in place of a node identifier, for convenience.

4. If none of the nodes in the SIBLING_LIST have a matching node in T1', create a parent node 'p' in T1', having the same tag type as the one in T2 (i.e. same as the parent of the nodes in the sibling list in T2). Insert all of the nodes in the sibling list into the newly created parent node in T1'. Next, move the newly created node (along with its children) to be the child of any internal node, preferably, one of the parent nodes at level_i–2, if such a level exists.

5. Let S be the subset of nodes in the SIBLING_LIST that have a match in T1'. Find a parent node 'p' in T1', which has the most siblings in the SIBLING_LIST. Move the rest of the matched nodes in S, to be the children of 'p'. If any subset of nodes being moved have a common parent 'q', and if 'q' has no other children, then collapse 'q' into 'p'. Else, individual nodes are moved by separate move operations.

The unmatched nodes in the SIBLING_LIST are inserted into 'p'.

Order the children of 'p' through swap operations. At the end of the swaps, all the children of 'p' which do not happen to be the children of its peer, if any, are gathered in the right-most corner. If there are such children, then a node split operation is performed, so that 'p' has exactly the same children as its peer. The newly created node (sub-tree) is at the same level as 'p' and has the same parent as 'p'. Also, the tag type of 'p' is changed to be the same as its peer in T2, if it is different.

6. Assign a node identity to 'p', which is the collective identity of its latest children. Similarly, assign an identical identity to the peer node of 'p' in T2.

7. TO_BE_COMPLETED_LIST=TO_BE_COMPLETED_LIST-SIBLING_LIST.

8. If TO_BE_COMPLETED_LIST is not equal to NULL, then return to step 2, else continue.

Note that the above node movement operations cause changes in the relative positioning of sibling nodes. Hence, the node operations generated by the process should take into account the positional changes caused by node movements.

The system now applies the modification algorithm on T1' from FIG. 6C.

Level 3 scan

Applying steps 1 and 2, TO_BE_COMPLETED_LIST={g, c, f, e, b, a, z} and SIBLING_LIST={g, c}. The system locates the children 'g' and 'c' in T1', and chooses D0.Se2.P1 to be the parent. Applying step 4, the system notices that nodes D0.Se2.P1 and D0.Se0.P1 need to be collapsed. This brings together all the nodes in the SIBLING_LIST under a common parent (See FIG. 6D).

CLP(D0.Se2.P1, D0.Se0.P1)

Figure 6E:
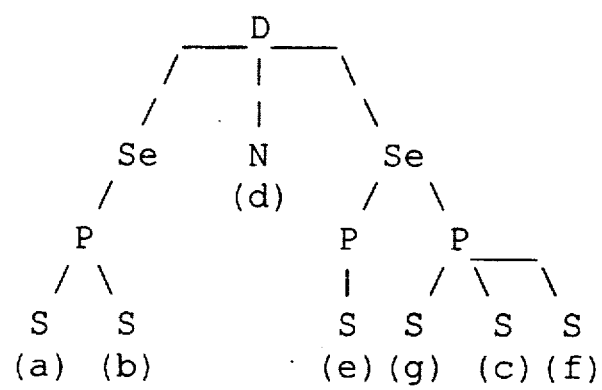

Next, the system uses swap operations to re-order the nodes (see FIG. 6E),

SWP(D0.Se2.P1.S1, D0.Se2.P1.S0)

SWP(D0.Se2.P1.S2, D0.Se2.P1.S1)

Figure 6F:
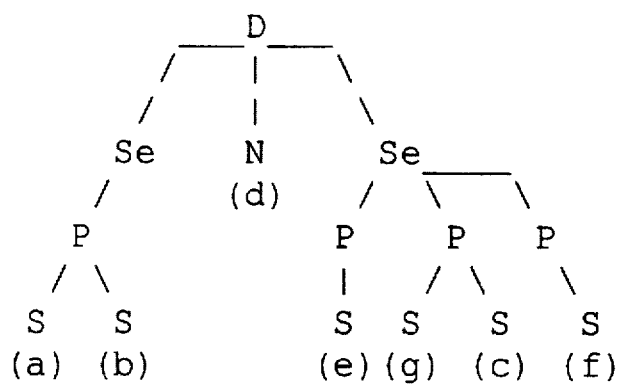

Next, a split operation is performed to move away children which do not truly belong to the parent (see FIG. 6F)

SPT(D0.Se2.P1, 2)

Figure 6G:
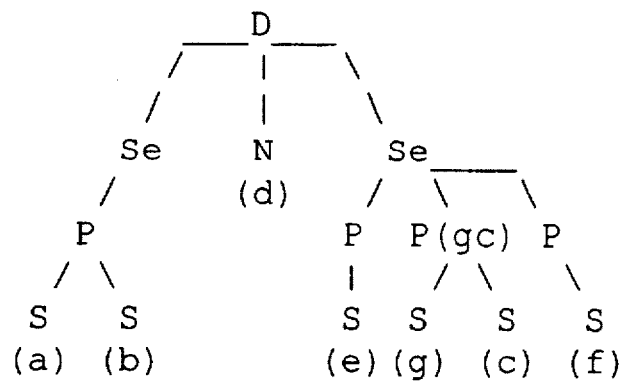

Applying step 5, the system generates an identity for D0.Se2.P1 and its peer in T2 (see FIG. 6G). Though T2 is not shown, it is assumed that the identity has been assigned Applying step 6, the system determines that TO_BE_COMPLETED_LIST={f, e, b, a, z}. Since TO_BE_COMPLETED_LIST is not empty, the system returns to step 2. SIBLING_LIST={f}. Step 3 and 4 do not produce any changes. Step 5 assigns an identity to D0.Se2.P2. Step 6 removes 'f' from TO_BE_COMPLETED_LIST. Repeating the same, the system eliminates 'd', and 'e' from TO_BE_COMPLETED_LIST.

Figure 6H:
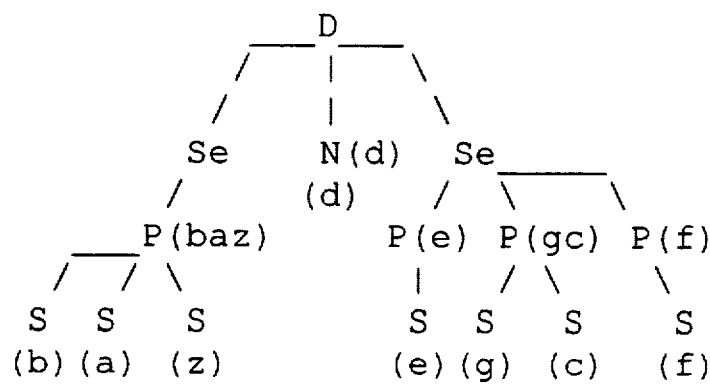

At this point, TO_BE_COMPLETED_LIST={b, a, z} and SIBLING_LIST={b, a, z}. Step 4 selects node D0.Se0.P0 as a matching node. At this point, node 'z' in the SIBLING_LIST is unmatched in T2. Hence, the system inserts node 'z'. Next, the system applies swap operations to order the children of D0.Se0.P0. Now, TO_BE_COMPLETED_LIST is NULL (see FIG. 6H).

INS(D0.Se0.P0.S0, z, {data})

SWP(D0.Se0.P0.S2, D0.Se0.P0.S0)

Level 2 scan

Figure 6I:
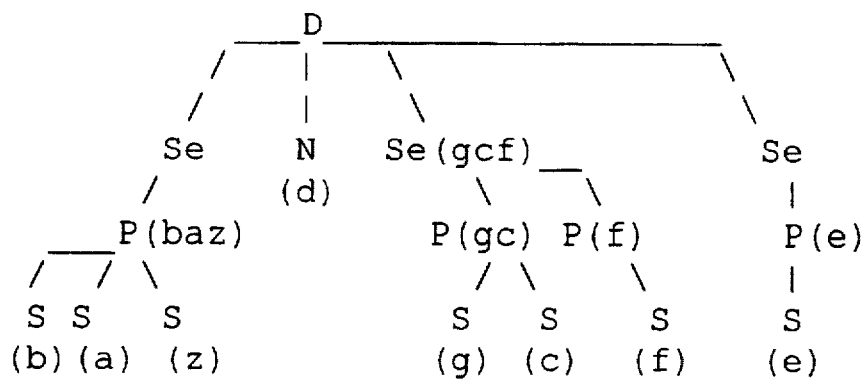

Applying steps 1 and 2 the system determines TO_BE_COMPLETED_LIST={gc, f, e, baz} and SIBLING_LIST={gc, f}. Applying step 4, the system chooses D0.Se2 as the parent. The system next applies swap operations to order the children, and then split the parent D0.Se2 to move away children that do not belong to D0.Se2. Applying step 5, the system generates identities for D0.Se2 and its peer in T2 (see FIG. 6I).

SWP(D0.Se2.P0, D0.Se2.P1)

SWP(D0.Se2.P1, D0.Se2.P2)

SPT(D0.Se2, 2)

Figure 6J:
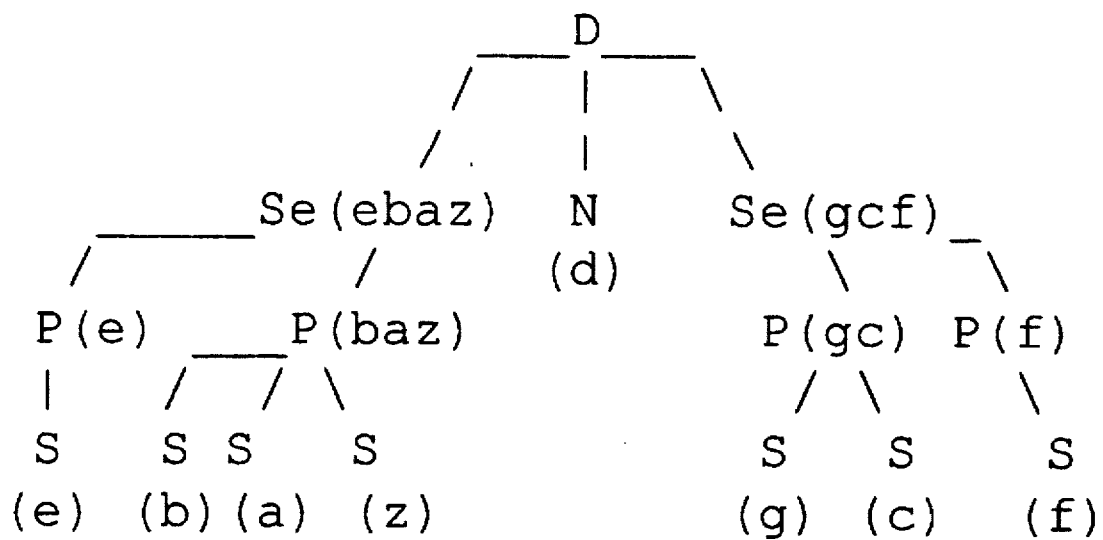

Now, TO_BE_COMPLETED_LIST={e, baz} and SIBLING_LIST={e, baz}. Applying step 4, the system chooses D0.Se0 as the parent. Since, P(e) is the only child, the system collapses D0.Se0 and D0.Se3, and then re-orders the children through swap operations. Applying step 5, the system generates identities for D0.Se0 and its peer in T2 (see FIG. 6J).

CLP(D0.Se0, D0.Se3)

SWP(D0.Se0.P0, D0.Se0.P1)

Level 1 scan

Figure 6K:
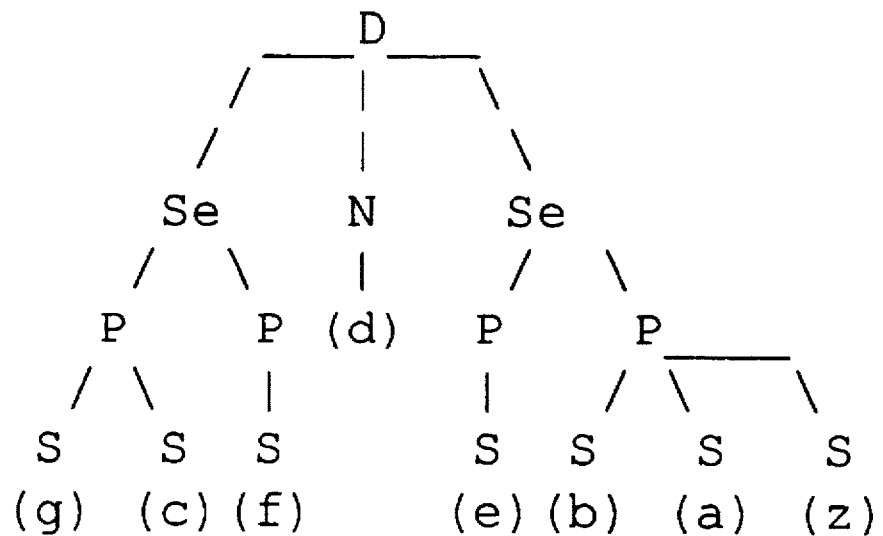

Applying steps 1 and 2 the system determines TO_BE_COMPLETED_LIST={ebaz, d, gcf} and SIBLING_LIST={ebaz, d, gcf}. Step 4 selects D0 as the parent, and applies the swap operations to re-order its children, which produces T2 (see FIG. 6K).

SWP(D0.Se0, D0.Se1)

Hence, the final set of transformations to transform T1 to T2 is:

DEL(D0.Se0.P0.S0),

DEL(D0.Se0.P0.S0),

DEL(D0.Se2.P2),

CLP(D0.Se2.P1, D0.Se0.P1),

SWP(D0.Se2.P1.S1, D0.Se2.P1.S0),

SWP(D0.Se2.P1.S2, D0.Se2.P1.S1),

SPT(D0.Se2.P1, 2),

INS(D0.Se0.P0.S0, z, {data}),

SWP(D0.Se0.P0.S2, D0.Se0.P0.S0),

SWP(D0.Se2.P0, D0.Se2.P1),

SWP(D0.Se2.P1, D0.Se2.P2),

SPT(D0.Se2, 2),

CLP(D0.Se0, D0.Se3),

SWP(D0.Se0.P0, D0.Se0.P1), and

SWP(D0.Se0, D0.Se1).

Additionally, if partial matches of leaf nodes were made, the leaf nodes need to be updated using UPD operations.

The above process requires all nodes in T2 be visited and matched with corresponding nodes in T1 once. The complexity of matching the internal nodes is $O(n1+n2)$, where n1 and n2 are the internal node counts of T1 and T2, respectively. Note that nodes can be matched by hashing node value identifiers.

Node movements and modifications also add to the overhead. If we consider a cost-based analysis, the cost of a transformation operation on a node 't' is a function of the number of children of 't'. Thus, the net cost of all transformations will be a function of the total number of nodes involved directly or indirectly in the transformation.

Since there are no cycles in the transforming operations, the overhead contributed by the node movements is bounded by $O(LK)$, where L is the number of levels in the tree, and K is a the number of leaf nodes. However, typically the number of nodes involved in the movements is very small and does not involve all the nodes in a tree.

Hence, the worst case time complexity of the algorithm is a summation of the cost of matching leaf nodes $O(K^2)$, the cost of matching internal nodes $O(n1+n2)$, and overhead contributed by node movements $O(LK)$. In an average case analysis, where the number of changes to a document are less than, for example, 20%, the time complexity is a summation of, the cost of matching leaf nodes $O(K)$, the cost of matching internal nodes $O(n1+n2)$, and overhead contributed by node movements $O(K)$.

Optimizations

There exist a number of additional optimizations that can be applied to the above process.

While trying to find a parent 'p' in T1' which has the most children in the SIBLING_LIST, if there is tie, choose a parent with the same tag-type as the one in T2.

While re-ordering nodes within the same parent (intra-node movement) through swap operations, if the node being moved out is not in the SIBLING_LIST, it can be directly moved to be the right-most child.

While re-ordering nodes within the same parent (intra-node movement) through swap operations, if the node being moved out is in the SIBLING_LIST, try to position the node being moved out through another swap operation.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention. The scope of the invention is defined by the appended claims.

What is claimed is:

1. A method for propagating changes in hierarchically organized data located on a server to a copy of the data located on a client, comprising:

receiving the changes to the data on the server;

applying the changes to the data on the server; and responsively to an event on the server and independently of the client, propagating the changes to the copy of the data by, determining differences between the data on the server and the copy of the data which the server has locally available, using the differences to construct an update for the copy of the data which the server has locally available, wherein the update may include node insertion and node deletion operations for hierarchically organized nodes in the data, and sending the update from the server to the client.

2. The method of claim 1, wherein the acts of determining the differences and constructing the update take place during a single pass through the data.

3. The method of claim 1, wherein the event on the server includes a timer completing a preprogrammed time interval.

4. The method of claim 1, wherein the event on the server includes a change to the data located on the server.

5. The method of claim 1, wherein the act of propagating the changes to the copy of the data on the client takes place automatically at regular time intervals.

6. The method of claim 1, wherein the act of propagating the changes to the copy of the data on the client takes place automatically at irregular time intervals.

7. The method of claim 1, wherein the act of determining the differences involves aggregating the changes to the data.

8. The method of claim 1, wherein the act of determining the differences involves examining the data after the changes have been applied to the data.

9. The method of claim 1, wherein the update includes a Multipurpose Internet Mail Extensions (MIME) content type specifying that the update contains updating operations for hierarchically organized data.

10. The method of claim 1, wherein the update additionally includes at least one from the group of, node move, node collapse, node split and node update operations.

11. The method of claim 1, wherein the update may include a node copy operation that makes an identical copy of a node as well as any subtree of the node that may exist.

12. The method of claim 1, wherein the update may include a node move operation that moves a node to another location in a tree of hierarchically organized nodes.

13. The method of claim 1, wherein the update may include a node split operation that splits a node into a pair of nodes, and divides any children of the node that may exist between the pair of nodes.

14. The method of claim 1, wherein the update may include a node collapse operation that collapses a pair of nodes into a single node, which inherits any children of the pair of nodes that may exist.

15. The method of claim 1, wherein a node deletion operation includes deleting any nodes that are subordinate to the node.

16. The method of claim 1, wherein the update may include a node swap operation that swaps two nodes as well as any subtrees of the nodes that may exist.

17. The method of claim 1, wherein the data that is hierarchically organized includes data that conforms to the HyperText Markup Language (HTML) standard.

18. The method of claim 1, wherein the data that is hierarchically organized includes data that conforms to the Extensible Markup Language (XML) standard.

19. The method of claim 1, wherein the data that is hierarchically organized includes a hierarchical database.

20. The method of claim 1, wherein the data that is hierarchically organized includes a directory service that supports a hierarchical name space.

21. The method of claim 1, wherein the copy of the data located on the client contains a subset of the data on the server.

22. The method of claim 1, wherein the server includes a proxy server for caching data in transit between a server and a client.

23. The method of claim 1, wherein the update includes data that is validated at the server.

24. A method for propagating changes in data located on a server to a copy of the data located on a client, comprising:
   receiving the changes to the data on the server;
   applying the changes to the data on the server; and
   propagating the changes to the copy of a subset of the data on the client automatically at regular time intervals by,
      determining differences between the data on the server and the copy of the data which the server has locally available,
      using the differences to construct an update for the copy of the data which the server has locally available, wherein the update may include at least one from the group of, node insertion, node deletion, node copy, node move, node collapse, node split, node swap and node update operations for hierarchically organized nodes in the data,
   validating the update at the server, and
   sending the update from the server to the client.

25. A computer readable storage medium storing instructions that when executed by a computer cause the computer to perform a method for propagating changes in hierarchically organized data located on a server to a copy of the data located on a client, comprising:
   receiving the changes to the data on the server;
   applying the changes to the data on the server; and
   responsively to an event on the server and independently of the client, propagating the changes to the copy of the data by,
      determining differences between the data on the server and the copy of the data which the server has locally available,
      using the differences to construct an update for the copy of the data which the server has locally available, wherein the update may include node insertion and node deletion operations for hierarchically organized nodes in the data, and
      sending the update from the server to the client.

26. An apparatus that propagates changes in data located on a server to a copy of the data located on a client, comprising:
   a receiving mechanism that receives the changes to the data on the server;
   a change application mechanism that applies the changes to the data on the server;
   a difference determining mechanism that determines differences between the data on the server and the copy of the data which the server has locally available, wherein the difference determining mechanism operates responsively to an event on the server and independently of the client;
   an update creation mechanism that constructs an update for the copy of the data, wherein the update may include node insertion and node deletion operations for hierarchically organized nodes in the data; and
   an update sending mechanism, that sends the update from the server to the client.

27. The method of claim 26, wherein the difference determining mechanism and the update creation mechanism operate concurrently during a single pass through the data.

28. The apparatus of claim 26, further comprising an updating mechanism on the client that applies the update to the copy of the data to produce an updated copy of the data.

29. The apparatus of claim 26, wherein the update additionally includes at least one from the group of, node move, node collapse, node split and node update operations.

30. The apparatus of claim 26, wherein the update includes a Multipurpose Internet Mail Extensions (MIME) content type specifying that the update contains updating operations for hierarchically organized data.

31. The method of claim 26, wherein the copy of the data located on the client contains a subset of the data on the server.

32. The method of claim 26, wherein the update includes data that is validated at the server.

33. A method for propagating changes in data located on a server to a copy of the data located on a client, comprising:
   receiving at the client an update for the copy of the data from the server, wherein the update may include node insertion and node deletion operations for hierarchically organized nodes in the data;
   applying the update to the copy of the data to produce an updated copy of the data; and
   responsively to an event on the server and independently of the client, propagating the changes to the copy of the data by;

determining differences between the data on the server and the copy of the data which the server has locally available, using the differences to constuct an update for the copy of the data which the server has locally available, wherein the update may include node insertiom and node deletion operations for hierarchically organized nodes in the data, and sending the update from the server to the client.

34. The apparatus of claim 33, wherein the update additionally includes at least one from the group of, node move, node collapse, node split and node update operations.

35. The apparatus of claim 33, wherein the update includes a Multipurpose Internet Mail Extensions (MIME) content type specifying that the update contains updating operations for hierarchically organized data.

36. The method of claim 33, wherein the copy of the data located on the client contains a subset of the data on the server.

37. The method of claim 33, wherein the update includes data that is validated at the server.

38. The method of claim 33, wherein the act of applying the update to the copy of the data takes place in semiconductor memory, whereby the update is able to proceed rapidly in the absence of time-consuming I/O operations.

* * * * *